United States Patent [19]
Ishihama et al.

[11] 4,346,964
[45] Aug. 31, 1982

[54] ELECTROCHROMIC DISPLAY DEVICE

[75] Inventors: Satoshi Ishihama; Taisuke Miyoshi; Koji Iwasa, all of Tokyo, Japan

[73] Assignee: Kabushiki Kaisha Daini Seikosha, Japan

[21] Appl. No.: 143,911

[22] Filed: Apr. 25, 1980

[30] Foreign Application Priority Data

May 28, 1979 [JP] Japan .................. 54-065916

[51] Int. Cl.³ ............................... G02F 1/17
[52] U.S. Cl. .............................. 350/357; 340/785
[58] Field of Search ............ 350/357; 340/763, 785

[56] References Cited
FOREIGN PATENT DOCUMENTS
54-123966 9/1979 Japan ..................... 350/357

*Primary Examiner*—James W. Davie
*Attorney, Agent, or Firm*—Robert E. Burns; Emmanuel J. Lobato; Bruce L. Adams

[57] ABSTRACT

An electrochromic display device having a simplified driving circuit. A colored display is performed by injecting an electric charge into the electrochromic layers of predetermined segments. The electric charge is transferred to the electrochromic layers of the other segments by applying a DC electric field between the predetermined segments and other segments to thereby change the display state.

11 Claims, 12 Drawing Figures

ELECTROCHROMIC DISPLAY DEVICE

BACKGROUND OF THE INVENTION

This invention relates generally to an electrochromic display device, and more particularly to an electrochromic display device having a simplified driving circuit.

Electrochromic devices are well-known devices which exhibit a phenomenon known as "persistent electrochromism", e.g. see U.S. Pat. No. 3,521,941 entitled, "Electro-Optical Device Having Variable Optical Density", issued July 28, 1970. The term "persistent electrochromism" denotes the property of a material whereby its electromagnetic radiation absorption characteristic is altered, in most instances, even at ambient temperature, under the influence of an electric field. Such materials, for example, may exhibit little or no absorption of visible wavelength in the absence of an electric field and therefore be transparent, but when subjected to an electric field, effectively absorb in the red end of the spectrum, thereby turning blue in color. Similar effects can be observed in other portions of the electromagnetic spectrum, invisible as well as visible.

There have been numerous studies of the electrochromic process which occurs at the electrochromic electrodes. Various attempts at application of the electrochromic devices, such as in numerical displays, have been made, but most of those attempts have been discouraged by defects of the electrochromic devices, e.g. slow coloring and bleaching response, short cycle lifetime of coloring and bleaching, and problems with the method driving an electrochromic display device.

As described in earlier-filed U.S. patent application Ser. No. 953,596 filed Oct. 23, 1978, the electrochromic layers deposited by oblique evaporation have fast coloring and bleaching responses. This improvement made it possible to replace the $H_2SO_4$ electrolyte by $LiClO_4$ and extended the cycle lifetime. But the problems encountered with the driving of such an electrochromic display device have not been solved. Because the coloring and bleaching responses depend on the area of the electrochromic layers and the ambient temperature, the optical density of the colored electrochromic layers differs. For example, in case of displaying a figure "1", "7" or the like which has a small display area, the color of the display turns deep immediately, however, in case of displaying "8", "9", "6" or the like which has a large area, the color does not turn deep immediately, so that the shade of color of one figure may differ from that of another figure. It is very complicated and difficult to control the driving condition and to make an integrated circuit.

SUMMARY OF THE INVENTION

It is therefore an object of the invention to provide an improved electrochromic display device. Another object of the invention is to provide an electrochromic display device which is driven by a simplified circuit.

Another object of the invention is to remove the difference of the shade of color between various display figures.

These and other objects of the invention will become apparent in light of the following description.

DETAILED DESCRIPTION OF THE INVENTION

Figure 1:
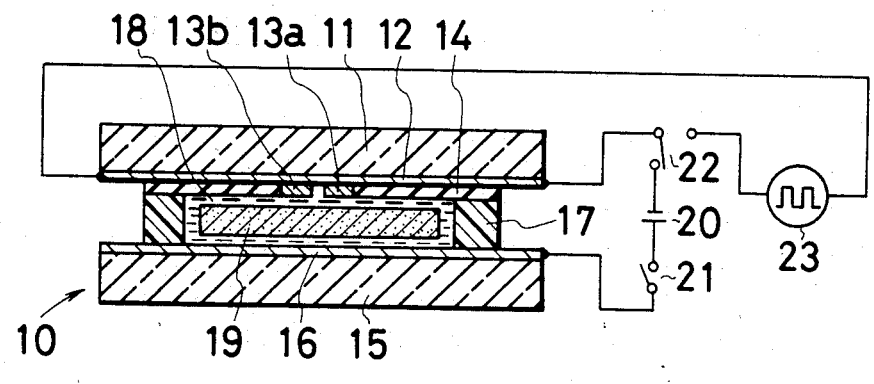
FIG. 1 is a cross-sectional view of an embodiment of electrochromic display device according to the present invention.

Referring initially to FIG. 1, an electrochromic display device of the present invention is generally designated as 10. The device includes a transparent substrate 11, e.g., glass or plastics, and a first transparent electrode 12, e.g., tin-doped indium oxide or antimony-doped tin oxide, on the substrate 11. Electrochromic layers 13a and 13b, e.g., $WO_3$, $MoO_3$ or $V_2O_5$, are disposed on the first electrode 12.

An electrolyte 18, such as sulfuric acid, lithium perchlorate in propylene carbonate, lithium nitride, $CaF_2$, $MgF_2$ or $Na_{1+x}Zr_2Si_xP_{3-x}O_{12}$, is in contact with a surface of the electrochromic layer 13. The electrolyte 18 is partially contained by a spacer 17. It is preferable that the spacer 17 be of a material which is inert with respect to the electrochromic environment of the device 10, e.g., a plastics. A second or counter electrode 16 is in contact with the electrolyte 18 such that the electrolyte 18 is completely contained by the electrochromic layer 13, the spacer 17, and the second electrode 16. The second electrode 16 may comprise gold film deposited on the substrate 15, e.g., glass or plastics.

The coloring mechanism of the electrochromic material is not fully understood but when the electrochromic material is $WO_3$, the coloring process is believed to occur with the simultaneous injection of electrons and positive ions into the colorless $WO_3$, forming a so-called "tungsten bronze" by the following reaction

$$xM^+ + xe^- + WO_3 \rightleftharpoons M_x^+ WO_3 e_x^-$$

where $M^+$ is a positive ion, and x means a numerical value more than 0 and less than 1.

Figure 2:
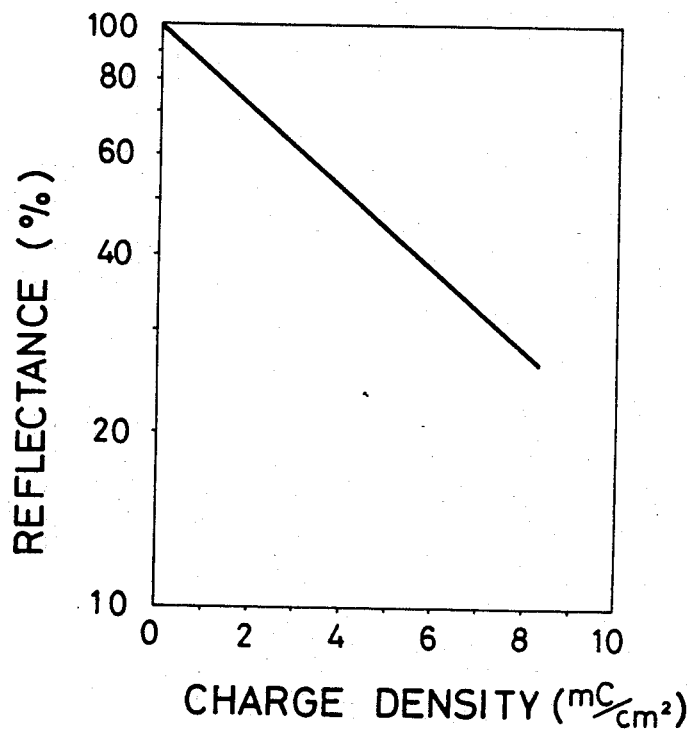
FIG. 2 is a graph showing the reflectance versus the charge density of the colored $WO_3$ electrodes.

Coloring and bleaching responses are measured as follows: Reflectance of the electrochromic layer decreases as the charge is injected into it as shown in FIG. 2. The reflectance of a light from the halogen lamp is measured by a photomultiplier through a filter designed so as to correspond to the visibility curve.

Figure 4:
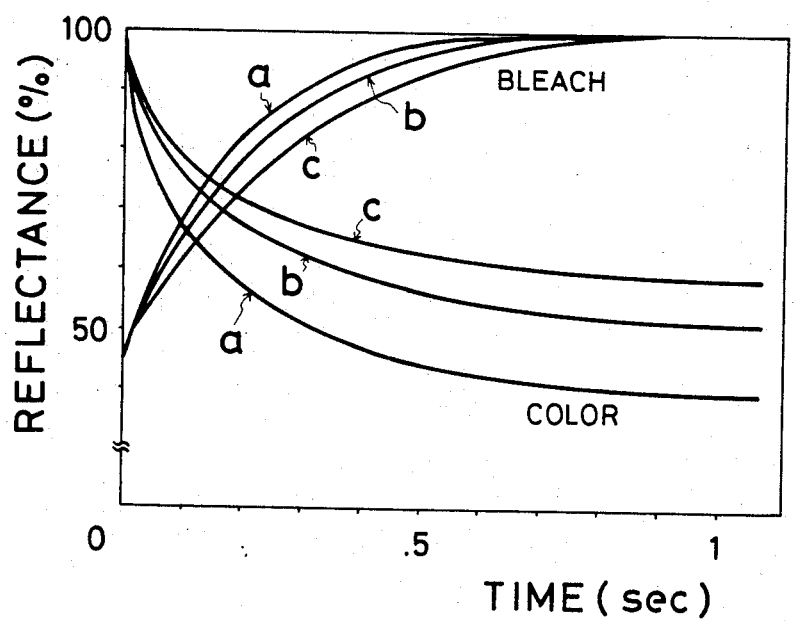
FIG. 4 is a graph showing the coloring and bleaching response as functions of the number of segments according to prior art.

FIG. 4 shows the coloring and bleaching responses by means of reflectance when a 1.5 V DC electric field is applied between $WO_3$ electrodes and a counter electrode according to the prior art. In this figure, "a", "b" and "c" show the reflectance of the $WO_3$ electrodes, in case that the $WO_3$ electrodes to be colored or bleached comprise 1, 2 and 3 segments respectively. Each of the segments has a uniform area. As shown in FIG. 4 the response depends on the number of segments involved. Therefore, when the figure in the actual numerical display changes, the pulse width of the applied voltage must be determined according to the number of segments which change from the colorless (bleached) state to the colored state and vice verse. Moverover, compensation for temperature dependence is necessary to fix the reflectance of the colored segments.

The driving circuit for driving the segments to bleached and colored states is very complicated and difficult to make, because there are various restrictions, especially in a watch display, such as IC chip size, battery voltage, and so on.

Figure 5:
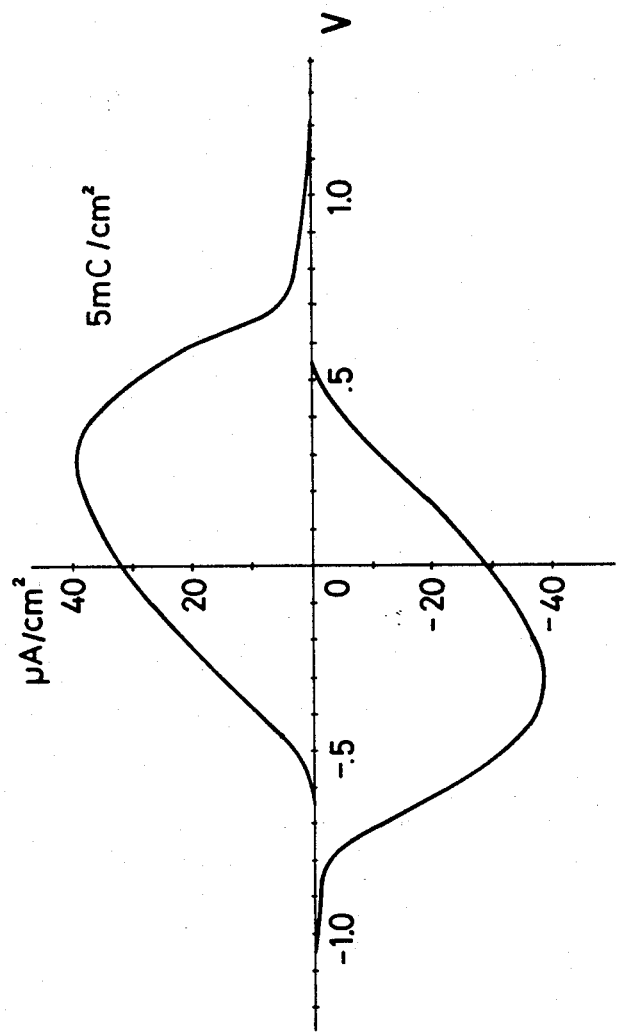
FIG. 5 is a cyclic voltammogram at a scan rate of 50 mV/sec for $WO_3$-$WO_3$ electrodes, initially holding 5 $mC/cm^2$ in the colored electrode.

A new driving method, designated the charge transfer system, solves these problems as follows: The colored segments hold charges (electrons and positive ions), but the colorless segments do not. When a DC field is applied between both segments so that the colorless segments are negative, the colored segments, from which charges are extracted, bleach; while the colorless segments, into which charges are injected, color. In other words, charges are transferred from the initially colored and bleaching segments to the initially colorless and coloring segments. As shown in FIG. 5, after all charges primarily held in the colored segments are transferred, no electric current flows. Therefore, the optical density of the colored segments is determined by the density of the charge held in them and is constant and independent of temperature.

Figure 6:
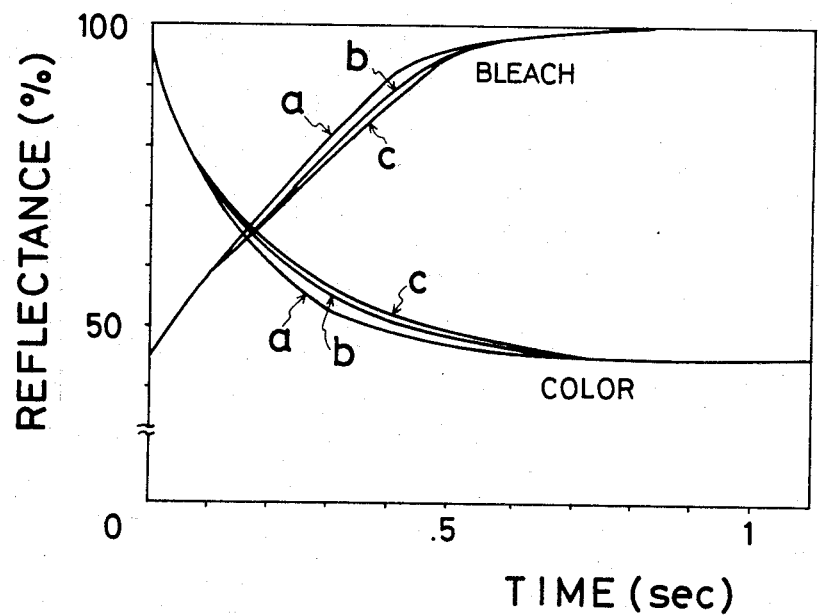
FIG. 6 is a graph showing the coloring and bleaching response by the charge transfer according to the invention.

FIG. 6 shows the coloring and bleaching responses by the charge transfer system using a 1.5 V DC electric field. The response is nearly unaffected by the number of segments. Also, the optical density of the colored segments is fixed by the density of the charge injected, independently of temperature. Therefore, there is no need to compensate for these factors and the driving circuit is greatly simplified.

EXAMPLE 1

The structure of an electrochromic device is shown in FIG. 1. The transparent electrode 12 is a tin-doped indium oxide deposited by vacuum evaporation on a transparent glass substrate 11. The electrochromic layers 13a, 13b are $WO_3$ electrodes deposited by vacuum evaporation on the transparent electrodes 12. On the part of the transparent electrode where $WO_3$ is not deposited, $Al_2O_3$ insulating layers 14 are deposited. The counter electrode 16 is a Au film deposited on the glass substrate 15. In the space between two substrates 11 and 15, a porous ceramic sheet 19 as the background is arranged and the electrolyte 18, $LiClO_4$ in propylene carbonate, is filled.

At first, a 1.5 V DC electric field was applied across the structure of the electrochromic device in FIG. 1, so that the $WO_3$ electrode 13a as negative with respect to the counter electrode 16, and the charge 5 mC/cm$^2$ was injected into the $WO_3$ electrode 13a, which turned blue with a reflectance of 42%. 100% means the fully bleached colorless state.

Next, a 1.5 V DC electric field was applied between the two $WO_3$ electrodes 13a and 13b so that the electrode 13b was negative relative to the other electrode 13a. The electrode 13b colored with the reflectance of 42%, and the electrode 13a bleached and returned to its original, colorless state, with the reflectance of 100%. As a result, the charge primarily injected into the $WO_3$ electrode 13a was transferred to the other $WO_3$ electrode 13b. Then, when the polarity of the applied electric field was reversed, the two $WO_3$ electrodes 13a and 13b exchanged their colorless and colored states.

Figure 3:
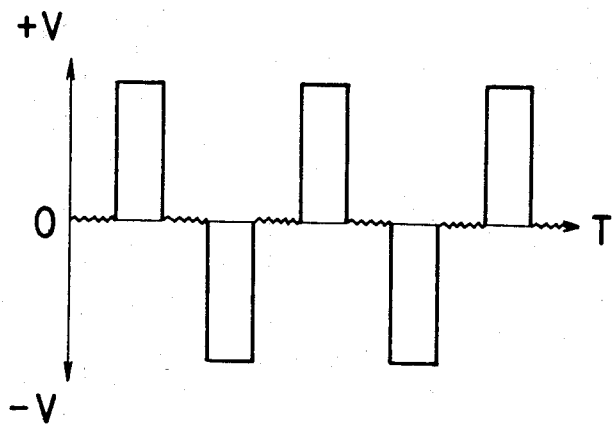
FIG. 3 is a graph showing the applied electric field between the $WO_3$ electrodes.

Thus, when the voltages were applied between the two $WO_3$ electrodes 13a and 13b, alternating in polarity as shown in FIG. 3, the two $WO_3$ electrodes 13a and 13b colored alternately with the same optical density.

EXAMPLE 2

Figure 7:
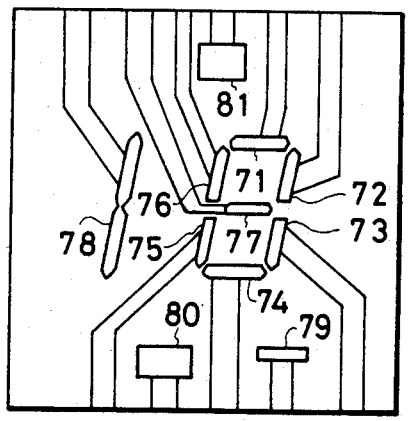
FIG. 7 is a plan view showing an embodiment of the numerical display according to the invention.

The structure of a second electrochromic device is identical with that of EXAMPLE 1, although the $WO_3$ electrodes are configured as segments for numerical display as shown in FIG. 7. Eight segments 71 to 78 inclusive are used to display numerals but 3 segments 79 to 81 inclusive are used as auxiliary segments and may be hidden by a cover plate or the like.

The area of each segment 71 to 77 inclusive and 79 is S, that of 78 and 80 is 2S respectively, and that of 81 is 3S, where S is 1 mm$^2$.

At first, a 1.5 V DC electric field was applied between eight segments, 71 to 77 and 79, and the counter electrode, so that the eight segments were negative with respect to the counter electrode. Eight segments turned blue with a reflectance of 42% by the injected charge 5 mC/cm$^2$. But 3 segments, 78, 80 and 81 were colorless with no charge. The colored 7 segments 71 to 77 except for the colored auxiliary segment 79 displayed the figure "8".

Next, a 1.5 V DC electric field was applied between the segments 75, 79 and the segment 80. The charge which had been held in the segments 75, 79 was transferred to the segment 80 and as the total area of the segments 75, 79 was 2S, equal to the area of the segment 80, the reflectance of the colored segment 80 was also 42%. Therefore, the display showed the figure "9" uniformly colored.

By repeating the application of an electric field in the same way, the charge in the segments 77, 80 was transferred to the segments 75, 78 and the figure changed to "10".

As described above, by applying a DC voltage between the $WO_3$ electrodes, the charge initially held in the colored electrodes is transferred to the primarily colorless electrodes and the display changes. In this driving method, designated the charge transfer system, the driving circuit is of relatively simple construction and coloring and bleaching responses hardly depend on the number or the area of the display segments even in a practical numerical display, and moreover even if the response varies depending on the ambient temperature, the optical density of the colored segments does not vary and is constant.

EXAMPLE 3

The structure of a third electrochromic device is identical with that of EXAMPLE 1.

At first, a 1.5 V DC electric field was applied across the structure of the electrochromic device so that the $WO_3$ electrode 13a was negative with respect to the counter electrode 16, and the charge 4.8 mC/cm$^2$ was injected into the $WO_3$ electrode 13a, which turned blue with a reflectance of 45%. The $WO_3$ electrode remained in the colored state even after the removal of the applied electric field.

Next, a 1.5 V DC electric field was applied between the WO$_3$ electrodes 13a and 13b so that the electrode 13b was negative relative to the other electrode 13a. The electrode 13b colored with the reflectance of 45% and the electrode 13a bleached and returned to its original, colorless state, with the reflectance of 100%.

When the polarity of the applied electric field was reversed, the two WO$_3$ electrodes 13a and 13b exchanged their colorless and colored states.

Figure 8:
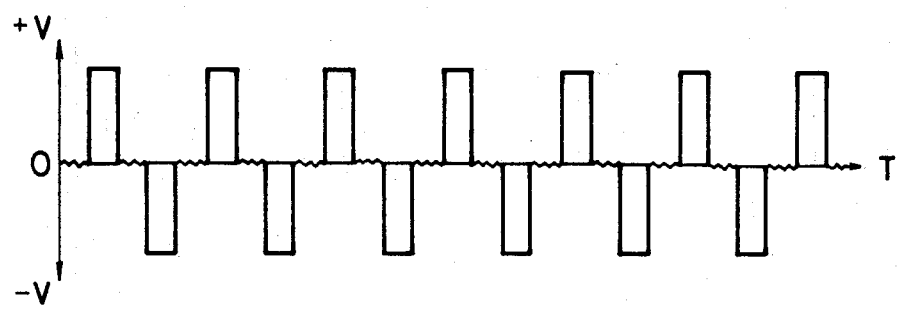
FIGS. 8(A), 8(B), 8(C) and 8(D) are waveforms showing voltages, current and reflectance, illustrating the drive of an embodiment of the invention.
Figure 8:
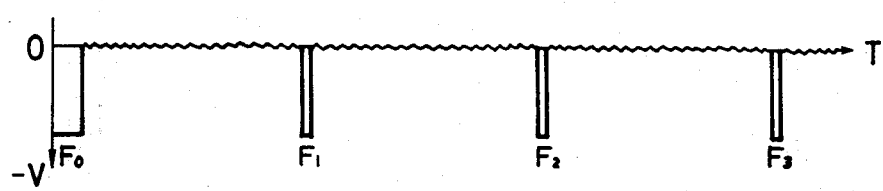
Figure 8:
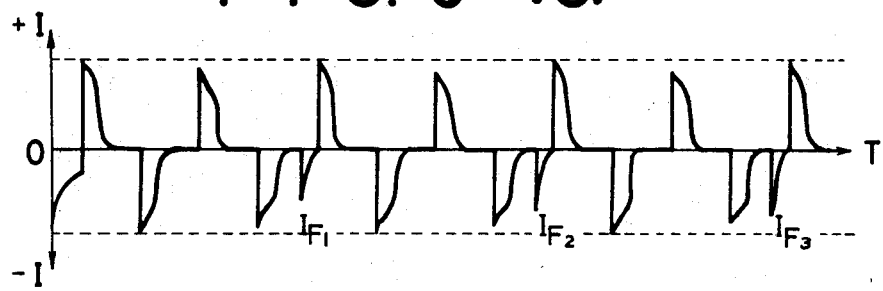
Figure 8:
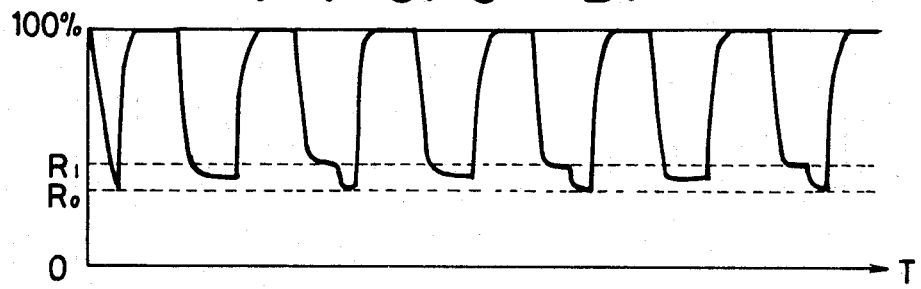

Thus, when the voltages were applied between the two WO$_3$ electrodes 13a and 13b, alternating in polarity as shown in FIG. 8(A), the two WO$_3$ electrodes 13a and 13b colored alternately with the same optical density and repeated the cycle of coloring and bleaching.

But during many cycles of coloring and bleaching, the charge held in the colored electrodes was gradually lost and after $10^3$ cycles of coloring and bleaching, the charge density decreased to 4.1 mC/cm$^2$ and the reflectance rose to 50%. After $10^4$ cycles, the charge density decreased to 3.3 mC/cm$^2$ and the reflectance rose to 55%.

Therefore, in oder to keep the charge density constant for a long period, it is necessary to compensate for the loss of charge. FIG. 8(B) is a graph showing the applied electric field between the colored WO$_3$ electrodes and the counter electrode to compensate for the loss of charge. The first pulse voltage $F_0$ is the field to inject the charge initially into the WO$_3$ electrode 13a. FIG. 8(C) is a graph showing the electric current and FIG. 8(D) is a graph showing the reflectance of the WO$_3$ electrode 13a. As the cycle of coloring and bleaching is repeated, the charge held in the colored electrodes is gradually lost and decreases, and the electric current when the charge is transferred decreases in FIG. 8(C) and the reflectance rises in FIG. 8(D). Therefore, by the pulse voltages $F_1$ to $F_3$ in FIG. 8(B), the charge loss and the reflectance rise are compensated as shown in FIGS. 8(C) and 8(D).

In the present example the compensating pulse was applied every 1000 to 5000 cycles. In a watch display indicating hour and minute, it was enough to apply a compensating pulse once a day.

EXAMPLE 4

Figure 9:
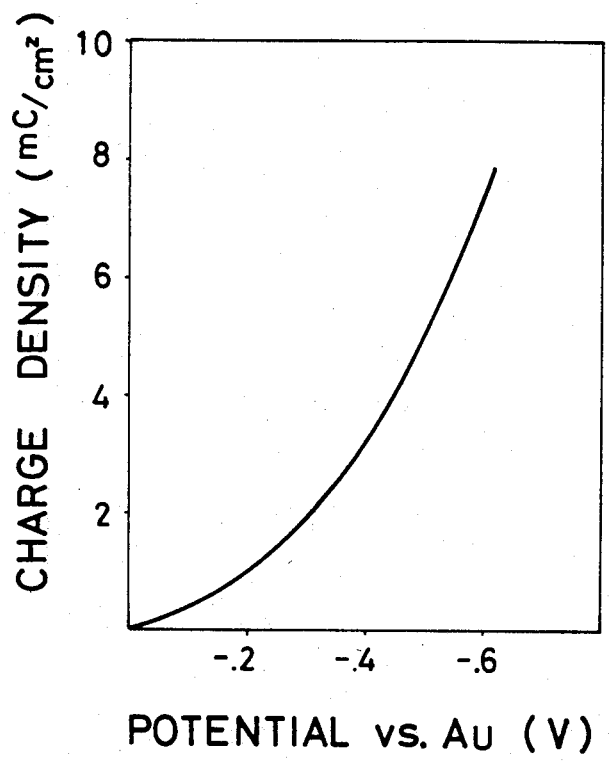
FIG. 9 is a graph showing the relation between the charge density and the potential vs. Au.

An electrochromic device is identical with EXAMPLE 3, except for the compensating pulse. The pulse voltage was determined by the relation between the charge density and the potential versus Au counter electrode shown in FIG. 9. The potential vs. Au is $-0.5$ V for the charge density 5 mC/cm$^2$. The cycle of coloring and bleachng was repeated with $-0.5$ V compensating pulse and over $10^6$ cycles the charge held in the colored electrodes hardly varied and was about 5 mC/cm$^2$ independently of the compensating pulse width and the interval to compensate.

We claim:

1. In an electrochromic display device of the type having a plurality of electrode segments comprised of electrochromic material in contact with an electrolyte such that the electrode segments exhibit either colored or bleached states depending on the amount of electric charge held by the electrode segments: means for selectively applying a DC electric field between preselected bleached electrode segments and colored electrode segments effective to transfer electric charges between the preselected electrode segments through the electrolyte to thereby change the display state of the electrochromic display device.

2. An electrochromic display device according to claim 1; wherein each of the electrode segments has an area which is about an integer multiple of the area of the electrode segment having the smallest area.

3. An electrochromic display device according to claim 2; wherein some of the electrode segments comprise display segments disposed in a pattern to form a display, and others of the electrode segments comprise auxiliary segments which do not form part of the display.

4. An electrochromic display device according to claim 3; wherein the pattern of display segments comprises a numerical display.

5. An electrochromic display device according to any one of claims 1, 2, 3 or 4; wherein the electrode segments comprise layers of electrochromic material disposed on transparent electrodes.

6. An electrochromic display device according to any one of claims 1, 2, 3 or 4; wherein the electrolyte comprises a salt.

7. An electrochromic display device according to claim 6; wherein the electrolyte salt comprises lithium perchlorate.

8. An electrochromic display device according to claim 6; wherein the electrolyte sale comprises lithium perchlorate in propylene carbonate.

9. An electrochromic display device according to claim 5; wherein the transparent electrodes comprise tin oxide.

10. An electrochromic display device according to any one of claims 1, 2, 3 or 4; wherein the means for selectively applying a DC electric field comprises means for selectively applying a DC electric field of alternate polarity between groups of colored and bleached electrode segments to thereby change the display state of the electrochromic display device.

11. An electrochromic display device according to any one of claims 1, 2, 3 or 4; wherein the means for selectively applying a DC electric field comprises means for applying a DC electric field effective to maintain the charge density of the colored electrode segments at about 5 mC/cm$^2$.

* * * * *